(No Model.) 2 Sheets—Sheet 1.

E. W. WHITMORE.
LEAD PIPE COUPLING.

No. 545,928. Patented Sept. 10, 1895.

Witnesses
E. A. Woodbury
A. N. Pomeroy

Inventor
Erwin W. Whitmore
By his Att'y
Henry W. Williams (No Model.) 2 Sheets—Sheet 2.

E. W. WHITMORE.
LEAD PIPE COUPLING.

No. 545,928. Patented Sept. 10, 1895.

Witnesses
E. A. Woodbury.
A. N. Pomroy.

Inventor
Erwin W. Whitmore,
By his Att'y
Henry W. Williams

UNITED STATES PATENT OFFICE.

ERWIN W. WHITMORE, OF LYNN, MASSACHUSETTS.

LEAD-PIPE COUPLING.

SPECIFICATION forming part of Letters Patent No. 545,928, dated September 10, 1895.

Application filed May 4, 1895. Serial No. 548,134. (No model.)

*To all whom it may concern:*

Be it known that I, ERWIN W. WHITMORE, a citizen of the United States, residing at Lynn, in the county of Essex and State of Massachusetts, have invented a new and useful Improvement in Lead-Pipe Couplings, of which the following is a specification.

This is a coupling for connecting an end of lead pipe with a pipe made of iron or other hard metal, or attaching an end of lead pipe to a structure, such as a tank or trap made of lead, or for connecting two ends of lead pipe or applying a branch of lead pipe to a section of pipe; and it has for its object to couple on the pipe securely, easily, and in such a manner that the coupling will be perfectly water-tight.

The nature of the invention is fully described below and illustrated in the accompanying drawings, in which—

Figure 1:
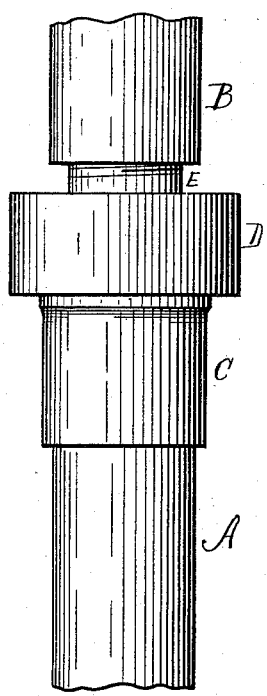
Figure 2:
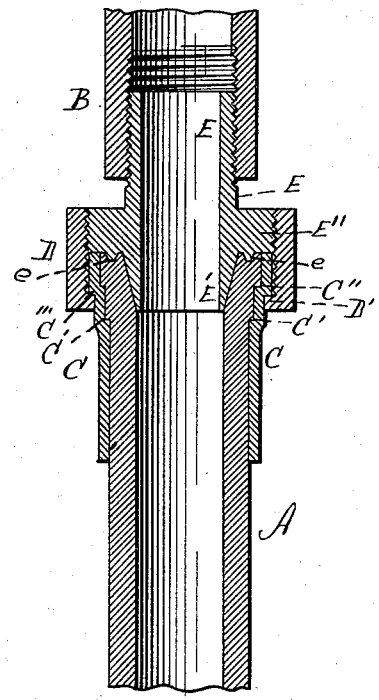
Figure 3:
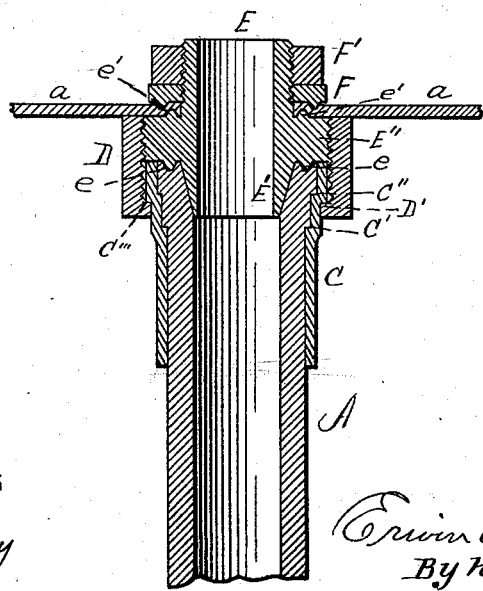
Figure 4:
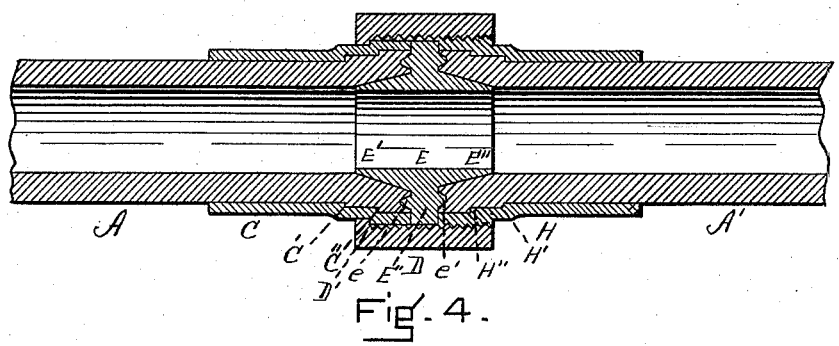
Figure 5:
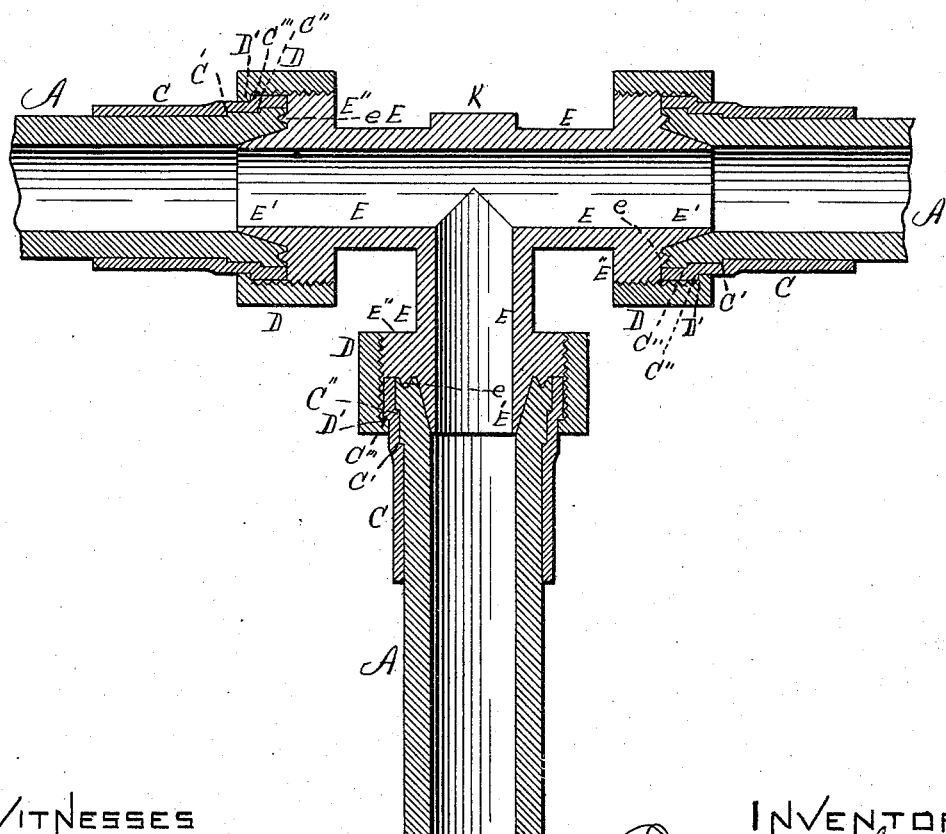

Figure 1 is an elevation showing a piece of lead pipe coupled onto a section of iron pipe. Fig. 2 is a longitudinal section of the same. Fig. 3 is a longitudinal section showing a piece of lead pipe connected by my coupling with a lead tank or trap. Fig. 4 is a longitudinal section showing two pieces of lead pipe connected by my coupling. Fig. 5 shows a straight run of pipe provided with a branch embodying my improved coupling.

Similar letters of reference indicate corresponding parts.

A represents a piece of lead pipe. In Figs. 1 and 2 this pipe is coupled onto a piece of iron pipe B. In order to accomplish this by my invention, the end of the lead pipe A is first inserted in the connecting-pipe C, which is provided on its inner surface with annular steps C' C'', the portion of the same surface of the pipe between said steps being not cone-shaped, but of even diameter, as shown. The end of the lead pipe is forced into this connecting-pipe by a well-known tool until it is spread and pressed tightly against it and conforms to the shape of the steps C'. By means of an external flange or annular shoulder C''' the pipe C is held against the ledge D' on the inner surface of the internally-screw-threaded collar D.

E is a coupling-pipe, the outer end of which is screw-threaded to fit the iron pipe B, the inner end E' of which is cone-shaped or tapered to fit the flaring end of the lead pipe A, and the central portion of which is provided with a thick annular extension forming an integral ring E'', which is threaded to engage with the thread on the inner surface of the collar D. The rear edge or side of this ring E''—that is to say, the surface next the lead pipe—is provided with an annular rib e, made V-shaped in cross-section. This rib, when the above-mentioned parts are screwed together, presses into the extreme end of the lead pipe, as shown. Thus it will be seen that the lead pipe fits snugly against the rib and against the steps C' C'', while the tapered end E' completes the fit. This coupling is quickly applied, is firm, and is intended to be absolutely water-tight.

In Fig. 3 the lead pipe is applied to a lead tank, of which a is a portion. The connecting-pipe C, with its ledges C' C'', is applied, as above mentioned, to the lead pipe and held in the collar D, which is screwed upon the coupling-pipe E by means of the integral ring E'', the conical end E' and rib e performing the same function as above described. In addition, however, a second rib e' is provided, this rib being exactly similar to the rib e, but located on the opposite face of the ring E''. Between this rib and a washer F, screw-threaded and running on the coupling-pipe E, the lead tank a is pressed by a nut F', and hence made to conform to said rib and to the face of the ring E'', thus making a water-tight joint without packing.

In Fig. 4 the coupling is shown applied to a straight run of pipe, the ends of the pipes A A' being connected thereby. The end of the pipe A is forced between the tapered end E' of the coupling-pipe E and the steps C' C'' on the inner surface of the connecting-pipe C, while the collar D engages, by means of the ledge D', the shoulder C''' of the pipe C, all as above set forth. This collar, however, does not engage a screw-thread on the surface of the coupling-pipe E, but a screw-thread on the surface of the connecting-pipe H, which is made exactly similar to the connecting-pipe C as far as its inner surface is concerned, being formed with steps H' H'', which are exactly like the steps C' C''. Moreover, the other end of the coupling-pipe E is tapered at E''', while its integral ring E'' is provided with two ribs *e e'*, as in Fig. 3. The collar D draws the ends of the pipes A A', respectively, between the parts E' C and E" H and against the ribs *e e'*.

In Fig. 5 a T-joint K is formed at all of three ends exactly as illustrated in Figs. 2, 3, and 4—that is to say, into the coupling-pipes E, provided with the tapered ends E' and integral annular rings E", formed with the V-shaped ribs *e*—the only difference being that in Fig. 4 this ring E" is not provided with an external screw-thread, while in all the other figures it is so provided. The connecting-pipes C are formed exactly as described in the previous figures, and the operation of the collar D is exactly as described in connection with Fig. 2.

It should be understood that in all these figures the pipes A, coupling-pipes E, as far as their ends E', and ribs *e* on their rings E" are concerned, and the collars D, as far as their inside construction is concerned, are exactly the same in all respects. In other words, the means for applying the coupling to the pipe A is exactly the same in all the figures. The only differences are such as relate to the means of connection with the pipes or tanks to which the pipes A are to be applied, joined, or coupled onto.

Having thus fully described my invention, what I claim, and desire to secure by Letters Patent, is—

1. In a pipe coupling of the character described, the coupling tube E provided with the tapered end E' and integral ring E" formed on its face which is next the lead pipe with the annular rib *e*, and the connecting pipe C provided on its inner surface with the steps C' C", the end of the pipe A being forced against said annular rib and crowded between said tapered end of the coupling tube and the stepped inner surface of the connecting pipe C, substantially as described.

2. In a pipe coupling of the character described, the coupling tube E provided with the tapered end E' and integral ring E" formed on its face which is next the lead pipe with the annular rib *e*, the connecting pipe C provided on its inner surface with the steps C' C" and on its outer surface with the annular shoulder C''', and the collar D provided on its inner surface with the annular ledge D' for engagement with said shoulder, substantially as set forth.

ERWIN W. WHITMORE.

Witnesses:
HENRY W. WILLIAMS,
E. A. WOODBURY.